(12) United States Patent
Ng et al.

(10) Patent No.: US 8,116,040 B2
(45) Date of Patent: Feb. 14, 2012

(54) LATCH ASSEMBLY FOR A HEAD OR HEAD ASSEMBLY

(75) Inventors: Hwa Liang Ng, Singapore (SG); Clifford Jayson B. Camalig, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 444 days.

(21) Appl. No.: 12/465,026

(22) Filed: May 13, 2009

(65) Prior Publication Data

US 2010/0290161 A1 Nov. 18, 2010

(51) Int. Cl.
G11B 5/54 (2006.01)

(52) U.S. Cl. .................. 360/256; 360/264.2

(58) Field of Classification Search .................. 360/256, 360/256.4, 264.2
See application file for complete search history.

(56) References Cited

U.S. PATENT DOCUMENTS

| | | | |
|---|---|---|---|
| 5,303,101 A | 4/1994 | Hatch et al. | 360/105 |
| 5,694,271 A | 12/1997 | Stefansky | 360/105 |
| 5,805,384 A | 9/1998 | Bronshvatch et al. | 360/105 |
| 5,818,667 A | 10/1998 | Larson | 360/106 |
| 5,875,073 A | 2/1999 | Andrews et al. | 360/105 |
| 6,005,750 A | 12/1999 | Willar et al. | 360/104 |
| 6,134,077 A | 10/2000 | Misso et al. | 360/105 |
| 6,473,959 B1 | 11/2002 | Macpherson et al. | 29/602.1 |
| 6,535,357 B1 | 3/2003 | Misso et al. | 360/256.2 |
| 7,149,058 B2 | 12/2006 | Hong et al. | 360/256.2 |
| 7,414,813 B2 | 8/2008 | Huynh | 360/264.2 |
| 7,649,718 B1 * | 1/2010 | Edwards | 360/264.2 |
| 7,667,931 B1 * | 2/2010 | Brause et al. | 360/264.2 |
| 7,903,377 B2 * | 3/2011 | Huang et al. | 360/264.2 |
| 2002/0054456 A1 | 5/2002 | Misso et al. | 360/256.4 |
| 2002/0075604 A1 | 6/2002 | Hong et al. | 360/256.2 |
| 2002/0149883 A1 | 10/2002 | Dague et al. | 360/256.2 |
| 2003/0210500 A1 | 11/2003 | Hong et al. | 360/256.1 |
| 2004/0240117 A1 | 12/2004 | Chang et al. | 360/256.2 |
| 2004/0264058 A1 | 12/2004 | Huynh | 360/264.2 |
| 2005/0152069 A1 | 7/2005 | Jeong | 360/256.2 |
| 2006/0176658 A1 | 8/2006 | Hardt et al. | 361/683 |
| 2008/0226949 A1 | 9/2008 | Hanraham | 428/812 |
| 2010/0027166 A1 * | 2/2010 | Huang et al. | 360/265.9 |
| 2010/0085665 A1 * | 4/2010 | Macpherson | 360/264.2 |

OTHER PUBLICATIONS

"Design Strategies for Viscoelastic Damping Treatment Applied to Automotive Components", Balmes et al, Paper revised from IMAC 2004 Proceedings, 9 pages.
3M "Polymers Useful for Damping, Viscoelastic Damping Polymer 110, VHB Adhesive Transfer Tapes 9460, 9469, 9473"; Technical Bulletin, Apr. 2003; 9 pages.

* cited by examiner

*Primary Examiner* — Hoai V Ho
*Assistant Examiner* — Pablo Huerta
(74) *Attorney, Agent, or Firm* — Braden Katterheinrich

(57) ABSTRACT

A soft or passive latch to control a position of a head relative to a data storage media is disclosed. In illustrated embodiments, the latch provides a dwell point or region along the flex circuit assembly. In illustrated embodiments, the dwell point or region corresponds to alignment of the head in a middle region of the media. In illustrated embodiment, the latch is formed of a lower or reduced bending stiffness region, which in illustrated embodiment is formed via a cut-out, contoured, or reduced width portion of a constraint layer damper or other layer(s) along the flex circuit assembly.

18 Claims, 8 Drawing Sheets

US 8,116,040 B2

LATCH ASSEMBLY FOR A HEAD OR HEAD ASSEMBLY

BACKGROUND

Data storage devices store digitally encoded information or data on a magnetic storage media. Illustrative data storage media include a rotating disc having a plurality of concentric data tracks. A head is positioned relative to one or more of the plurality of concentric data tracks via a positioning device such a voice coil motor, microactuator or other positioning device. In illustrative embodiments, the positioning device is energized to move the head between an inner diameter and an outer diameter of the disc or other storage media.

During an operational period, the disc is rotated and the positioning device is actuated to locate the head relative to select data tracks on the disc or storage media. For proximity or near proximity recording, rotation of the disc creates an air flow along an air bearing surface of the head. Air flow along the air bearing surface is pressurized to provide a lifting force so that the head "floats" above the data storage media or disc.

During non-operational periods, the device is powered off and rotation of the disc stops. For contact starts and stop devices (CSS), during non-operational periods, the head is parked on the disc or media surface. Typically, the positioning device locates the head proximate to a laser textured zone to park the head on the disc or media surface. The laser textured zone reduces head-media stiction so that when the disc is rotated, air flow along the air bearing surface releases the head to float above the media surface.

During a standby or idle period, when the head is not actively reading or writing data, a bias current is typically supplied to maintain a position of the head relative to the media surface. The head is typically biased away from the laser textured zone since contact between the head and the laser textured zone can damage the head, burnish the laser bumps and generate particles which can damage the transducer elements on the head. The head is usually biased proximate to a middle region of the media or disc so that following the standby or idle period, the head is not located beyond a guard-band signal or servo data proximate to an outer diameter of the media or disc. If the head floats beyond the guard-band signal or servo data, it will be difficult for the device to identify a current position of the head for seek operations following the standby or idle period.

Maintaining a bias current however requires power and for portable devices use of power during the standby or idle period can shorten the useful life or duration of the battery or other power source. Embodiments of the present invention provide solutions to these and other problems, and offer other advantages over the prior art. The above discussion provides background information and is not intended to be used as a basis for determining the scope of the claimed subject invention.

SUMMARY

The present application discloses a soft or passive latch to control a position of a head relative to a data storage media. In illustrated embodiments, the passive latch is a flex circuit based latch and provides a dwell point or region along the flex circuit. In illustrated embodiments, the dwell point or region is located at a flexure point or zone corresponding to alignment of the head in a middle region of the disc or media. In illustrated embodiments, the latch is formed of a lower or reduced bending stiffness region of the flex circuit, which in illustrated embodiments is formed via a cut-out, contoured or reduced width portion of a constraint layer damper or other layer(s) along the flex circuit.

Other features and benefits that characterize embodiments of the present invention will be apparent upon reading the following detailed description and review of the associated drawings.

BRIEF DESCRIPTION OF THE FIGURES

FIG. 1-2 schematically illustrates an arm including a voice coil energizable to position a head relative to a media or disc.

FIGS. 2-1 and 2-2 comparatively illustrate orientation of a flex circuit assembly for different head positions relative to the media or disc.

FIGS. 3-1 and 3-2 graphically illustrate a flex force $F_{flex}$ profile for different flex characteristics or media applications.

FIGS. 5-1 through 5-3 schematically illustrate embodiments of a soft or passive latch formed on a layer or portion along the flex circuit assembly.

FIGS. 6-1 and 6-2 schematically illustrate embodiments of a soft latch or passive latch formed on a constraint layer damper along a flex circuit assembly.

DETAILED DESCRIPTION OF ILLUSTRATIVE EMBODIMENTS

Figure 1:
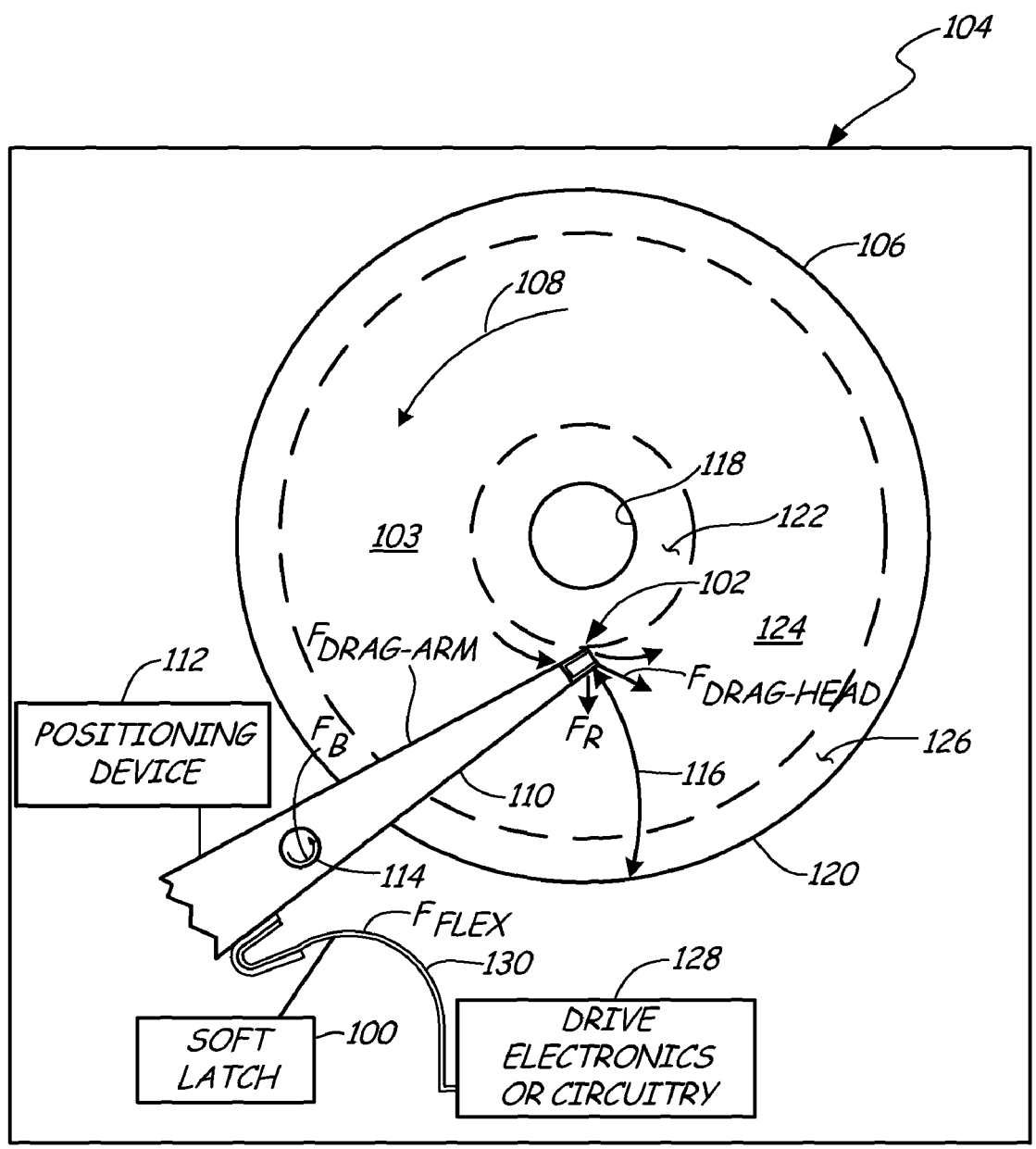
FIG. 1-1 schematically illustrates a data storage device including a soft or passive latch to control a position of a head or head assembly.

Embodiments of the present invention provide a soft or passive latch 100 (illustrated schematically) for controlling or maintaining a position of a head 102 relative to a media surface 103. FIG. 1-1 illustrates an embodiment of a data storage device 104 in which the soft latch 100 is used to control or maintain the position of head 102. In the embodiment illustrated in FIG. 1-1, the data storage device includes one or more rotating discs 106 (only one shown in FIG. 1-1) which forms the media surface 103. The one or more discs 106 are rotated as illustrated by arrow 108 via operation of a spindle motor (not shown). The head 102 is coupled to actuator arm 110 which is actuated via a positioning device 112 to locate the head 102 relative to data tracks on the rotating disc 106.

In the illustrated embodiment, the arm 110 is rotationally coupled to a base of the data storage device via bearing assembly 114 (illustrated schematically). The arm 110 rotates relative to the bearing assembly 114 to move the head 102 along an arcuate path as illustrated by arrow 116 between an inner diameter 118 and an outer diameter 120 of the disc 106. As shown, in the illustrated embodiment, the media or disc 106 includes an inner region 122, a middle region 124, and an outer region 126. Typically, data is stored in the middle region and the inner region 122 is laser textured to provide a landing zone for the head 102 as described in the Background.

The head 102 includes one or more read and/or write elements. Illustratively the read elements include magnetoresistive, giant magnetoresistive (GMR), tunneling magnetoresistive (TMR) or other read elements which, read magnetically encoded data from the media or disc 106. Illustratively, the write elements includes an inductive element energizable to magnetically encode data. As shown, the read and/or write elements on the actuator arm 110 interface with drive circuitry or electronics 128 through a printed flex circuit assembly 130 coupled to the arm 110 (or an E-block having a plurality of arms). The flex circuit assembly 130 includes a printed circuit or leads on a flexible substrate or base as is known to those of ordinary skill in the art. As shown, the flex circuit assembly 130 is flexed or curved to form a generally arced shape to connect to the arm 110 and the drive circuitry or electronics 128 at spaced ends of the flex circuit assembly 130.

Figures 1, 2:
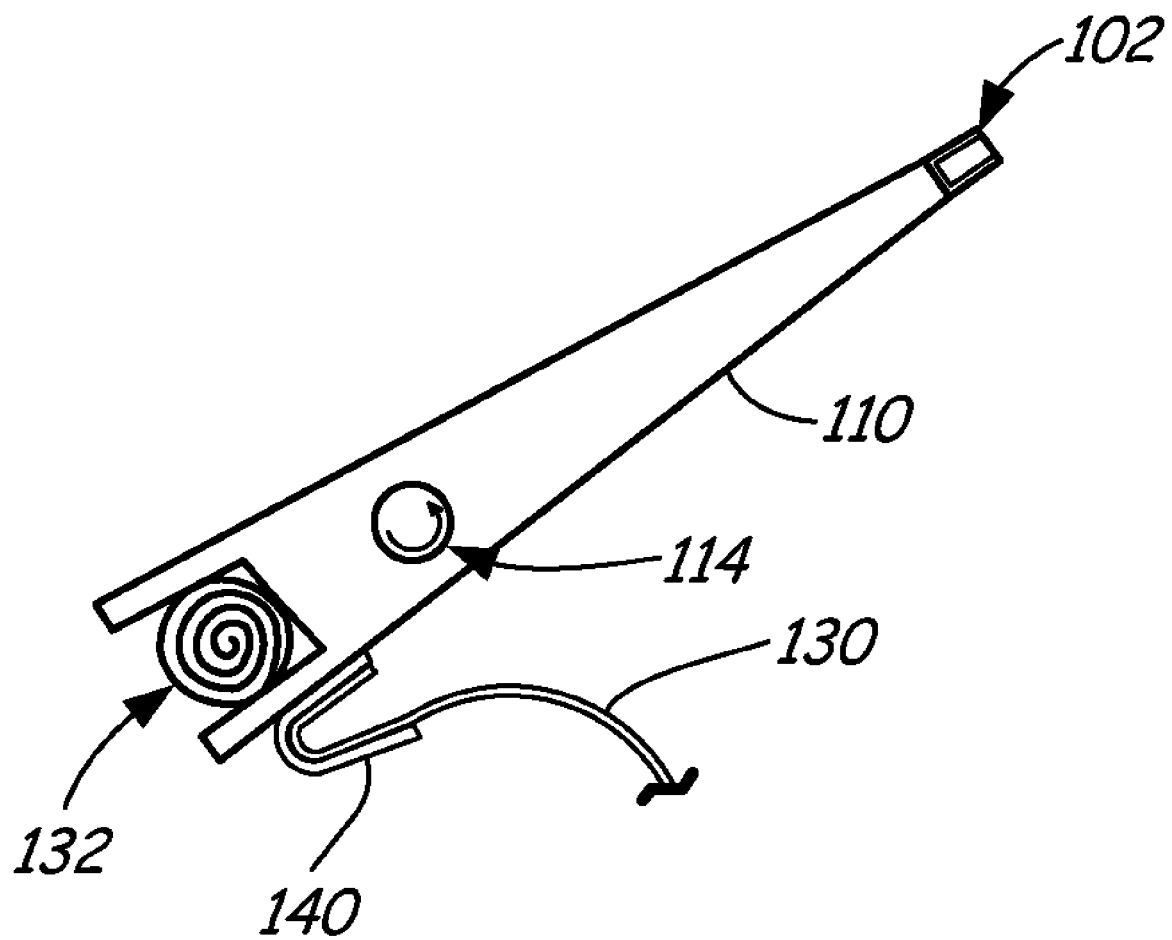
Figures 1, 2:
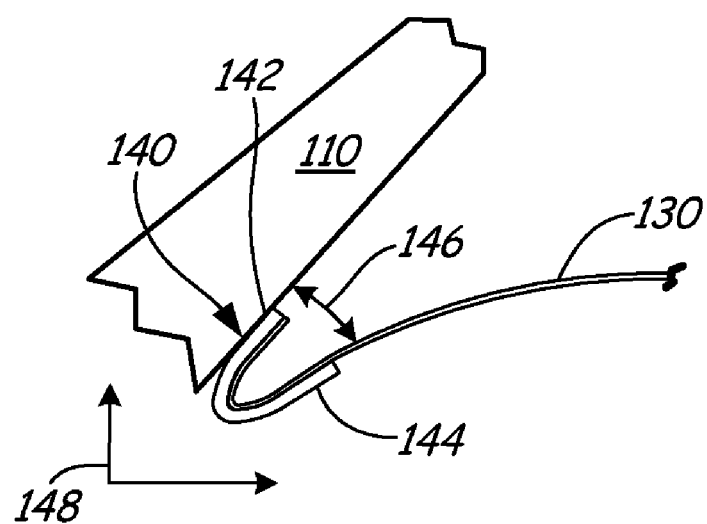
Figure 2:
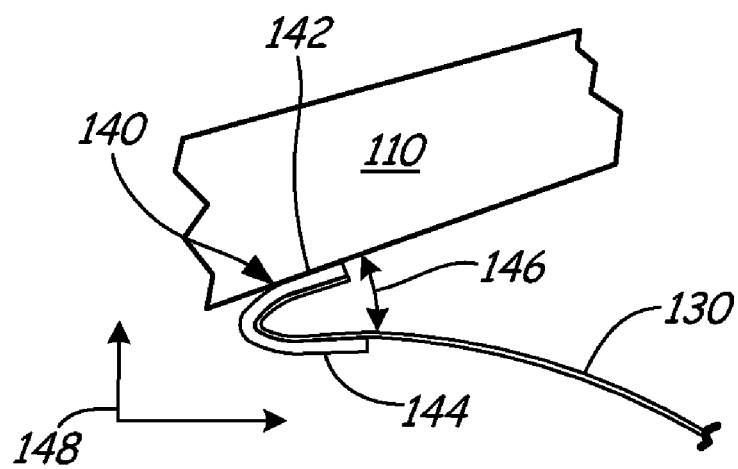

For proximity or near proximity recording, rotation of disc 106 creates an air flow along an air bearing surface of the head 102. Air flow along the air bearing surface of the head 102 is pressurized to provide a lifting force so that the head "floats" above the data storage media or disc 106 as previously described in the Background section. During an operational period, the positioning device 112 is energized to locate the head 102 relative to select data tracks on the disc 106. Illustratively, the positioning device 112 is a voice coil motor or other positioning device. In FIG. 1-2, arm 110 includes a voice coil 132 which in combination with a magnet assembly (not shown) forms the voice coil motor for positioning the head 102. The flex circuit assembly 130 provides an electrical interface between the voice coil 132 (or other positioning device) and drive circuitry 128 to position the head 102. Current is supplied to the voice coil 132 to move the head 102 relative to the media. During a standby or idle period, rotation of the disc 106 continues so that the head floats above the media or disc surface. Absent a bias current to the voice coil motor or other active control, the floating position of the head 102 relative to the media is dependent upon the forces acting on the arm 110 and head 102.

As illustrated in FIG. 1-1, the forces acting on the arm 110 and the head 102 generally include, a drag force on the head $F_{drag-head}$, a drag force on the arm $F_{drag-arm}$, frictional force of the bearing $F_B$, and a flex force $F_{flex}$ imparted to the arm 110 by the flex circuit assembly 130. The floating position of the head relative to the media is estimated based upon a summation of theses forces where Floating positions≈$F_{drag-head}$+$F_{drag-arm}$+$F_B$+$F_{flex}$. More specifically, air flow generated via rotation of the media or disc imparts a drag force $F_{drag-head}$ to the head. The drag force has radial component $F_R$ due to the skew angle of the head that biases the head outwardly toward the outer diameter 120 of the disc or media as shown in FIG. 1-1. The skew angle of the head 102 is larger proximate to the inner diameter 118 than the outer diameter 120 of the disc. Thus, the drag force of the head $F_{drag-head}$ is larger proximate to the inner diameter 118 than the outer diameter 120 of the disc or media.

Air flow generated via rotation of disc or media also imparts a $F_{drag-arm}$ to the arm 110. The drag force $F_{drag-arm}$ has a radial component that biases the head outwardly. Rotation of the arm 110 and head 106 is opposed or resisted by the friction force of the bearing $F_B$ and the inertia or mass of the arm 110. Additionally, as shown, the flex circuit assembly 130 connected to the arm 110 imparts a flex force $F_{flex}$. The flex force $F_{flex}$ of the flex circuit assembly 130 is analogous to a spring where F represents the flex force $F_{flex}$ and K and x are analogous to the stiffness and flexure of the flex circuit assembly 130 and bending curve of the flexure.

$$F = -Kx$$

The spring constant or stiffness K of the flex circuit or cable 130 is generally proportional to:

$$K \approx \frac{EA}{L}$$

where E is the modulus of elasticity of the flex circuit structure or material;
A is the cross-sectional area of the flex circuit or cable 130; and
L is the length of the flex circuit or cable 130.

The bending curve of the flexure is related or proportional to the relative position of the arm 110 and bracket 140, which connects the flex circuit 130 to the arm 110.

As shown in more detail in FIGS. 2-1 and 2-2, the flex circuit assembly 130 is connected to the arm 110 via the bracket 140. The bracket 140 includes a mounting portion 142 and a leg portion 144. The mounting portion 142 connects the flex circuit assembly 130 to the arm 110 and the leg portion 144, forms an exit angle 146 for the flex circuit assembly 130 relative the arm 110. In FIG. 2-1, a first rotational position of the arm is shown which locates the head (not shown) proximate to the inner diameter 118 of the media and in FIG. 2-2, a second rotation position of the arm 110 is shown which locates the head 102 proximate to the outer diameter 120 of the media. As comparatively shown in FIGS. 2-1 and 2-2 relative to a reference frame 148, an orientation of the exit angle 146 of flex circuit assembly 130 changes as the arm moves the head 102 between the inner and outer diameters 118, 120 of the media. Changes in the orientation of exit angle 146 or arm 110 changes the flexure point or bending curve of the flex circuit assembly along the flex region or zone as a result of movement of the arm or head between the inner and outer diameters 118, 120 of the media.

Figures 1, 3:
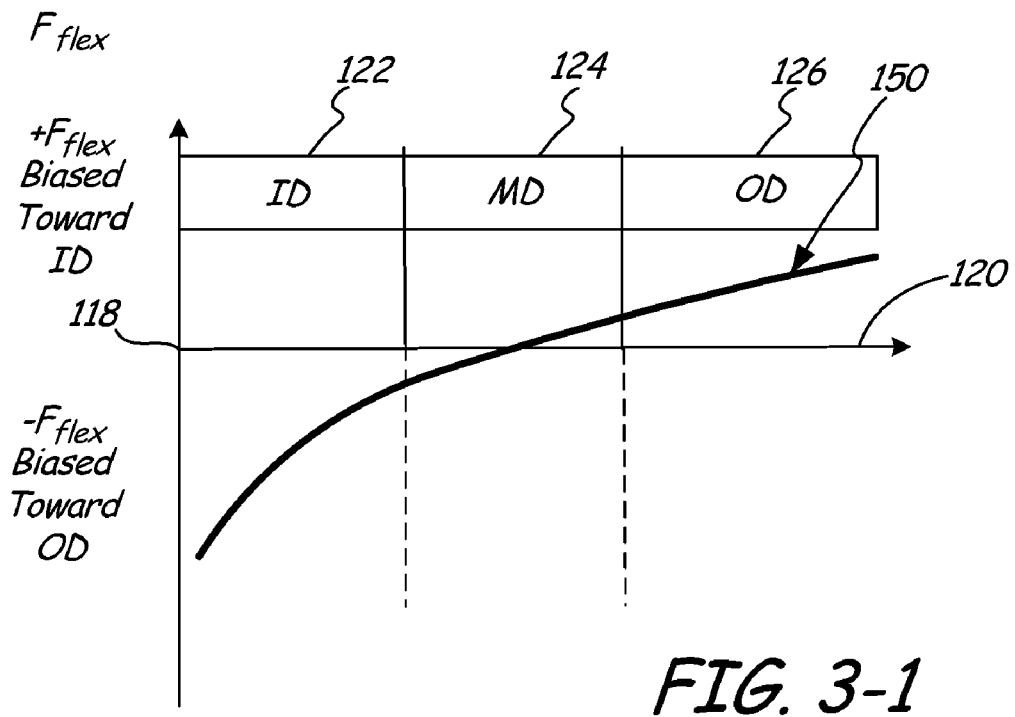
Figures 2, 3:
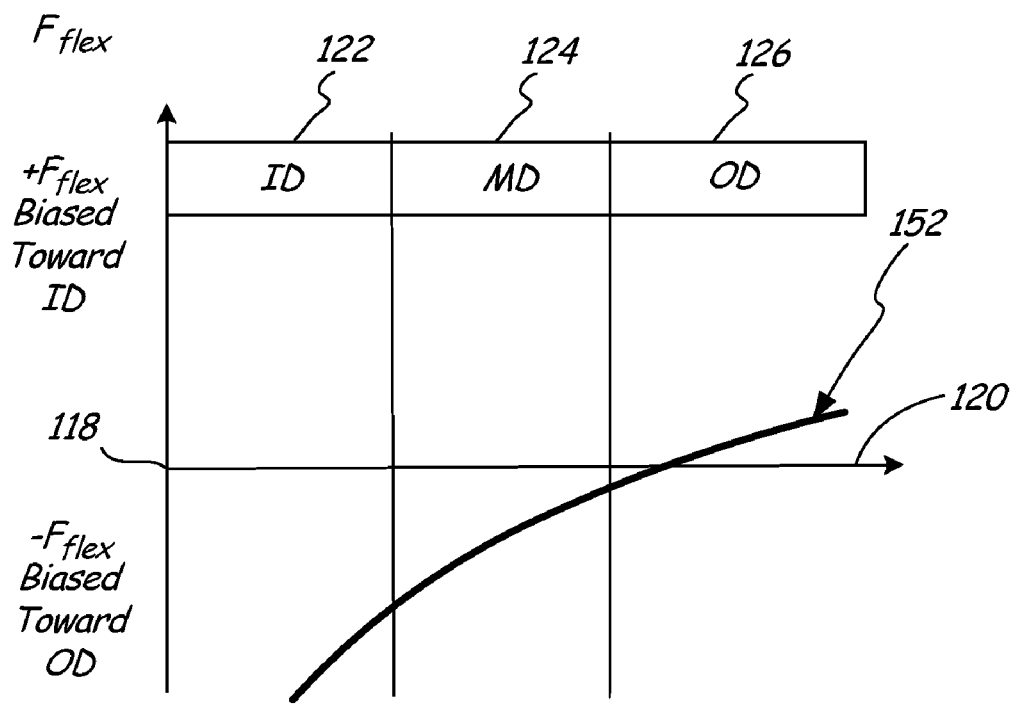

Changes in the flexure point or bending curve along the flex region or zone changes the flex force $F_{flex}$ imparted to the arm from the flex circuit or cable 130 based upon the stiffness K of the flex circuit assembly 130. FIG. 3-1 illustrates a flex force $F_{flex}$ profile 150 relative to different arm 110 positions. The illustrated profile 150 is exemplary of a flex circuit assembly 130 for a 3.5 inch media or disc. In the illustrated embodiment, when the arm 110 is positioned proximate to the inner diameter 118 of the media, the flex circuit assembly 130 imparts a large radial flex force $F_{flex}$ in the direction of the outer diameter 120. When the arm 110 is positioned proximate to the outer diameter, the flex force $F_{flex}$ is directed inward toward the inner diameter 118. In the illustrated embodiment, the flex or bias force $F_{flex}$ of the flex circuit assembly 130 is negligible proximate to a middle region 124 or diameter of the disc or media. Since the flex force $F_{flex}$ is negligible at the middle diameter, the head 102 tends to float proximate to the middle diameter. Tolerance variations and other factors can interfere with reliability the float position of the head 102.

FIG. 3-2 is another illustrative embodiment of a flex force $F_{flex}$ profile 152 relative to different positions of the arm 110 for a flex circuit assembly 130 having a similar stiffness as in FIG. 3-1. The illustrated profile 152 shows a flex force $F_{flex}$ profile 152 relative to radial position of the head 102 for data storage devices incorporating a 1.5 inch, 1.8 inch, 2.0 inch or a 2.5 inch diameter discs. The illustrated profile 152 shows changes in flex force as the head 102 moves between inner and outer diameters 118, 120 of the media or disc. In the illustrated embodiment, when the arm 110 is positioned proximate to the inner diameter 118 of the media, the flex circuit assembly 130 imparts a large radial force to bias the head 102 in an outward direction. At the middle region 124 or position, the radial bias force in the outward direction is smaller. As shown, the neutral position or region of negligible flex force $F_{flex}$ is proximate to the outer diameter 120 or region of the media or disc and thus, the head 102 has a tendency to float near the outer diameter or region of the media 126 absent a bias current or other active control.

In illustrated embodiments, it is desired to reliably locate and maintain the head 102 within the middle region 124 of the media during standby or idle periods. For example, if the floating position or radius of the head is proximate to the inner diameter or region, there is a greater likelihood of head-media interface with respect to a laser textured zone following the standby or idle period and if the floating position of the head is proximate to the outer diameter 120 or region there is a likelihood that it will be difficult to read servo data following the standby or idle period.

Figure 4:
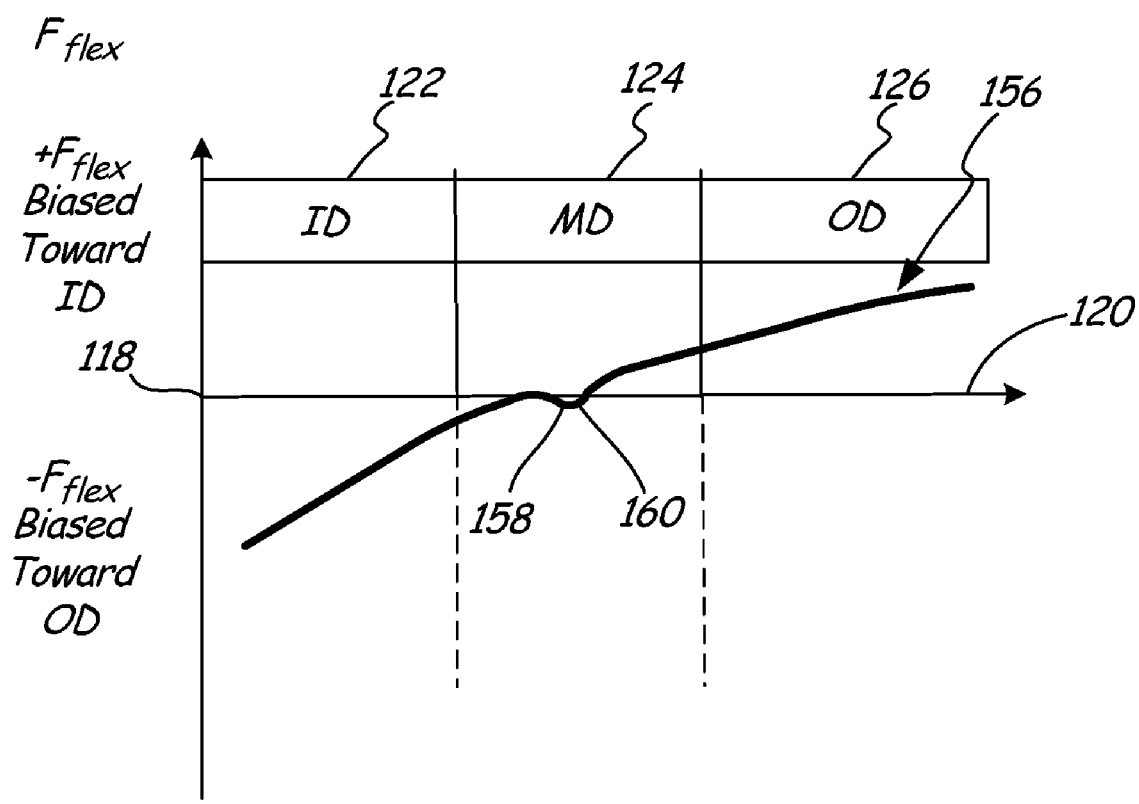
FIG. 4 graphically illustrates a flex force $F_{flex}$ profile for a flex circuit assembly having a dwell point or region.

Embodiments of the passive or soft latch 100 previously described are incorporated on the flex circuit assembly 130 to control the position of the head during standby or idle periods. The soft latch 100 provides a flex force $F_{flex}$ profile 156, which includes a flex-based dwell region 158 as illustrated in FIG. 4. As shown in FIG. 4, the flex-based dwell region 158 is aligned or located at a flexure point corresponding to a middle region 124 or middle diameter position of the head 102. Alignment of the dwell region 158 with the middle diameter position of the head holds the head position proximate to the middle diameter position absent a bias current or other active control.

In the illustrated embodiment, flexure or bending of the flex circuit or cable 130 is biased towards a dwell point 160 within the dwell region 158. As shown, the flex force $F_{flex}$ proximate to the dwell region 158 is negligible. In the inner region 122, the flex force $F_{flex}$ imparted to the arm 110 is directed outwardly and in the outer region an inward flex force $F_{flex}$ is imparted to the arm 110 biasing the head toward the dwell region 158. Following a standby or idle period, force imparted by the positioning device 112 (or voice coil motor) is sufficient to overcome the soft latch effect to position the head 102 relative to the media for read/write operations.

Figures 1, 5:
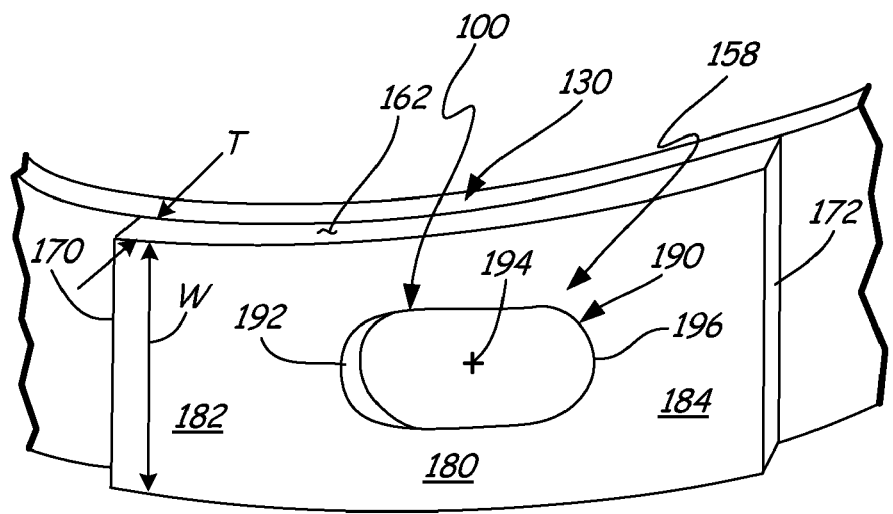
Figures 2, 5:
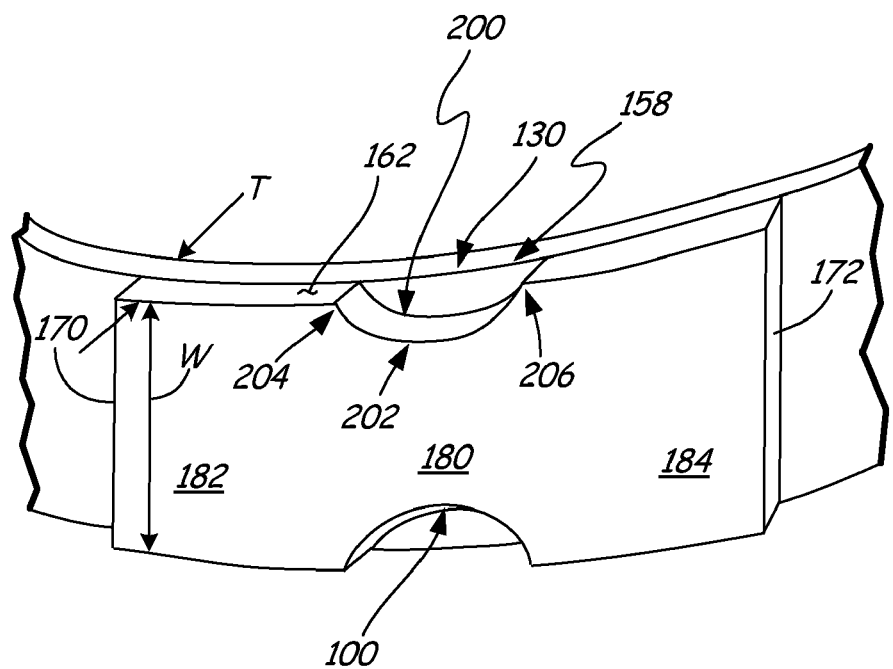
Figures 3, 5:
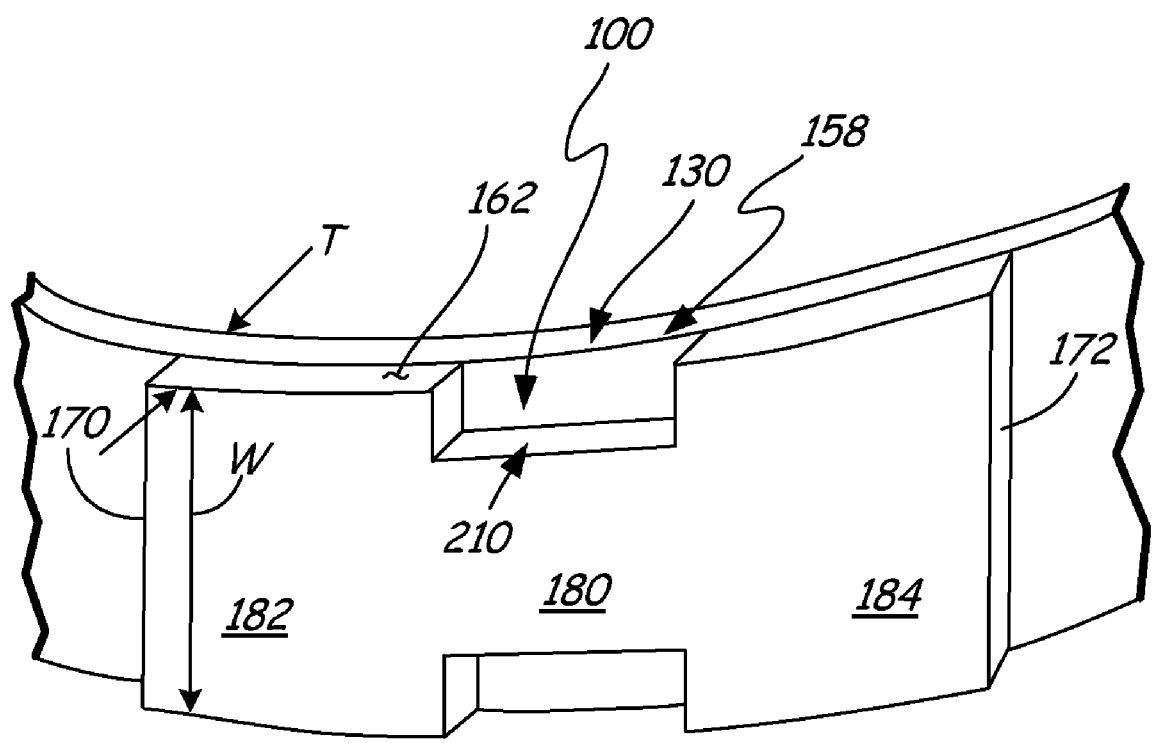

FIGS. 5-1 through 5-3 schematically illustrate embodiments of a soft latch 100 formed on layer or portion 162 along the flex circuit assembly 130 to control the position of the head. In the illustrated embodiment, layer or portion 162 includes a shortened length extending between a first end 170 and a second end 172. As shown, the shortened length is smaller than an overall length of the flex circuit assembly 130. The layer or portion 162 also includes a width dimension and a thickness dimension extending between opposed sides. The length, width and thickness of the layer or portion 162 influences the bending stiffness of the flex circuit assembly 130 as previously discussed with respect to the spring analogy. The layer or portion 162 is formed along the flex region or zone of the flex circuit assembly 130 defined relative to inner and outer position of the head 102. In each of the illustrated embodiments, the layer or portion 162 includes a localized portion 180 having a lower or reduced bending stiffness relative to adjacent or end portions 182, 184 to form the dwell region or dwell point. The dwell region 158 is positioned proximate to the middle of the flex region or zone to hold the head proximate to the middle region 124 of the media. In the illustrated embodiment, the reduced bending stiffness portion 180 is located proximate to a mid-point of an overall length of layer or portion 162.

In the embodiment illustrated in FIG. 5-1, the dwell region 158 or reduced bending stiffness portion 180 is formed by a cut-out area or void 190 along the mid-portion of layer or portion 162. The cut-out area or void 190 is positioned along the flex circuit assembly 130 so that the cut-out area or void 190 aligns with a bending region or zone of the flex circuit or cable 130 when the arm 110 is positioned in the middle region 124 of the media. The cut-out area or void 190 thus provides the dwell point 158 to soft latch the position of the arm 110 relative to the middle region 124 of the media.

As shown, the cut-out area or void 190 is oval shaped to provide a progressive dimension change. The width of the cut-out area or void 190 progressively increases from a first end 192 to a center point 194 and the width progressively decreases from the center point to the second end 196. Thus, as shown, the center point 194 of the cut-out area or void 190 has the lowest bending stiffness relative to adjacent portions 182, 184. The lowest bending stiffness provides the dwell point 160 for the flex circuit assembly 130 within the dwell region 156.

In FIG. 5-2 the dwell region 156 or reduced bending stiffness portion 180 is formed of an hour glass shape portion 200 having a narrower width dimension proximate to a center 202 of the hour glass shape to form the dwell point 160. As shown, the hour-glass shape portion 200 progressively widens toward outer ends 204, 206 of the hour glass shaped portion. The hour-glass shape provides a lower bending stiffness to form the dwell region 156 and dwell point 160 along the flex circuit assembly 130. In each of the embodiments illustrated FIGS. 5-1 and 5-2, the dwell region 156 or reduced bending stiffness portion 180 is shaped to provide a progressive dimension change to bias flexure of the flex circuit assembly 130 at dwell point 160 within the dwell region 156.

In embodiment illustrated in FIG. 5-3, the layer or portion 162 includes a stepped width portion 210 as shown to provide a reduced bending stiffness portion 180 between adjacent portions 182, 184. The reduced bending stiffness portion 180 is located along the flex circuit assembly to provide the dwell region 158 proximate to a middle region 124 of the media as previously described. FIGS. 5-1 through 5-3 illustrate exemplary embodiments or designs for providing a dwell point or region along a layer or portion 162 of the flex circuit assembly 130. In the illustrated embodiments, the reduced bending stiffness portion 180 can be fabricated using known stamping or etching techniques.

Additional embodiments or designs other than those illustrated in FIGS. 5-1 through 5-3 can be employed to form a lower bending stiffness region to form a dwell point or region along the flexure circuit assembly as will be appreciated by those skilled in the art. For example, in each of the illustrated embodiments, the region of reduced bending stiffness can be formed in a substrate, base or other layer of the flex circuit assembly 130.

Figures 1, 6:
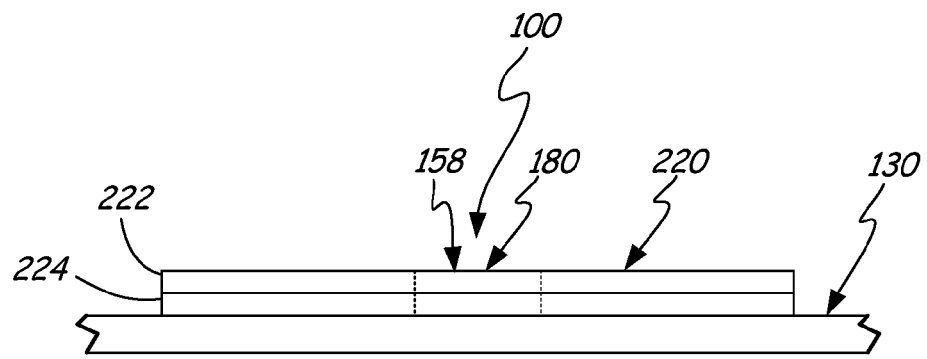
Figures 2, 6:
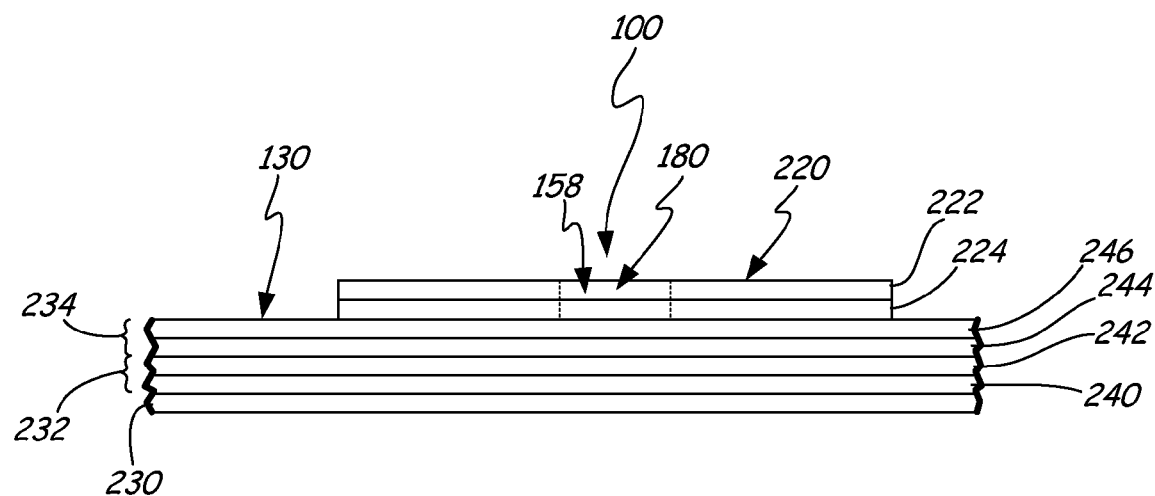

FIGS. 6-1 illustrates an embodiment of a dwell point or region formed on a constraint layer damper 220 attached or formed along the flex circuit assembly 130. In the illustrated embodiment, the constraint layer damper 220 includes a constraint or stiffening layer 222 and a damping layer 224. In the illustrated embodiment the stiffening layer 222 is formed of a Mylar™ polyester film, aluminum or stainless steel material and the damping layer 224 includes a visco-elastic damping adhesive or material. An illustrative visco-elastic damping adhesive or material is formed of a Viscoelastic Damping Polymer 110 or VHB Adhesive Transfer Tape available from 3M Corporation of St. Paul, Minn.

The visco-elastic damping layer 224 damps or reduces flex resonance or disturbances and the constraint or stiffening layer 222 absorbs mechanical resonance or vibration. As will be appreciated by those skilled in the art, the visco-elastic damping layer 224 is selected to ensure at normal drive operating temperatures, damping specification of the material match resonance frequencies of the particular flex circuit design. In the embodiment described, the dwell point or region is formed in the constraint layer damper along the flex circuit assembly 130 to form a soft latch integral with the flex circuit assembly 130. In particular, the constraint layer damper 220 has a portion having a reduced bending stiffness 180. The reduced bending stiffness portion 180 is formed of a void or cut-out region or alternatively a contoured or reduced width profile as previously described with respect to FIGS. 5-1 through 5-3.

FIG. 6-2 illustrates an embodiment of a flex circuit assembly 130 having a multiple layer construction. In the illustrated embodiment, the flex circuit assembly 130 includes a substrate or base 230 having a printed circuit pattern or leads 232 etched on the substrate or base 230. The printed circuit pattern or leads 232 are covered with a protective overlay 234. In the illustrate embodiment an adhesive layer 240 and copper layer 242 are deposited on the substrate or base layer 230 and etched to form the printed circuit pattern or leads 232. Thereafter, an adhesive layer 244 and a polyimide or other protective layer 246 are deposited as shown to form the protective overlay 234.

Additionally, as shown the constraint layer damper 220 is formed along the flex circuit assembly 130. The constraint layer damper 220 is formed of a stiffening layer 222 and a damping layer 224 as previously described. As shown, the damping layer 224 layer is deposited on the protective overlay 234. As previously described, the constraint layer damper 220 is contoured to provide the lower or reduced bending stiffness portion 180 to form a soft latch integral with the flex circuit assembly 130 as previously described. In an alternate embodiment, the soft latch or dwell region 158 can be formed in one or more layers of the protective overlay, substrate, base or other layer(s) of the flex circuit assembly. Application of the latch described herein is not limited to the particular embodiments disclosed or limited to a layer or portion 162 having a shortened length dimension as illustrated in FIGS. 5-1 through 5-3.

As described, embodiments of the application provide a soft latch configured to maintain a position of the head. In illustrated embodiments, the latch is formed as part of the flex circuit assembly to utilize the bending stiffness or flexure of the cable to control the floating position of the head. In embodiments illustrated in FIGS. 6-1 and 6-2, the soft latch is incorporated into the constraint layer damper 220. The configuration or specifications of the constraint layer damper 220 is first designed to optimize drive resonance damping performance. The drive resonance damping performance is optimized by optimizing various damper design such as size, shape and location of the constraint layer damper 220. Next, the configuration or parameters of the soft latch, such as size, shape and location, are determined based upon the design of the constraint layer damper 220. Although in illustrated embodiments, the soft latch 100 is located proximate to a middle region of the constraint layer damper 220, application is not limited to a particular location and the location of the soft latch 100 is designed to optimize performance.

In illustrated embodiments, the soft latch 100 is configured to locate the head proximate to the middle region of the media or disc as disclosed, however application is not limited to the particular embodiments or location of the dwell point or region as shown.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular data storage device or application as schematically shown in FIG. 1, it will be appreciated by those skilled in the art that the teachings of the present invention can be applied to other devices and applications, and can employ different configurations and structures without departing from the scope and spirit of the present invention.

What is claimed is:

1. An assembly for use in a data storage device including an actuator arm operable to position a head relative to a data storage media, the assembly comprising:
   a flex circuit assembly configured to electrically connect electrical components on the actuator arm to drive circuitry of the data storage device; and
   a dwell region or point along the flex circuit assembly, the dwell region or point having a lower bending stiffness relative to adjacent portions of the flex circuit assembly and forming a soft latch on the flex circuit assembly to hold a position of the head relative to the data storage media.

2. The assembly of claim 1 wherein the flex circuit assembly includes one or more layers separate from a substrate or base of the flex circuit assembly and the dwell region or point is formed on the one or more layers separate from the substrate or base of the flex circuit assembly.

3. The assembly of claim 1 wherein the dwell region or point is formed on a constraint layer damper along the flex circuit assembly where the constraint layer damper comprises a damping layer and a stiffening layer separate from the substrate or base of the flex circuit assembly.

4. The assembly of claim 3 wherein the stiffening layer comprises a polyester film and the damping layer comprises a visco-elastic damping layer.

5. The assembly of claim 1 wherein the dwell region or point is formed of a cut-out or void portion forming the lower bending stiffness relative to the adjacent portions of the flex circuit assembly.

6. The assembly of claim 1 wherein the dwell region or point is formed of an hour-glass shaped portion forming the lower bending stiffness relative to the adjacent portions of the flex circuit assembly.

7. The assembly of claim 1 wherein the dwell region or point is formed of a reduced width portion forming the lower bending stiffness relative to the adjacent portions of the flex circuit assembly.

8. The assembly of claim 1 wherein the flex circuit assembly is connected to the actuator arm movable to position the head relative to the data storage media and the dwell region or point is located to latch the head at a selected position relative to the data storage media.

9. The assembly of claim 8 wherein the data storage media includes an inner region, a middle region and an outer region and the dwell region or point is located to latch the head proximate to the middle region of the data storage media.

10. An assembly for use for a data storage device comprising:
    a flex circuit assembly having an elongate flexible length and configured to provide an electrical interface for components of the data storage device; and a constraint layer damper including a visco-elastic damping layer and a stiffening layer along a portion of the flex circuit assembly and the constraint layer damper having a dwell region or point having a lower bending stiffness than adjacent portions of the constraint layer damper to soft latch a head relative to a data storage media.

11. The assembly of claim 10 wherein the dwell region includes a dwell point forming a lower bending stiffness than adjacent portions of the dwell region to bias the bending of the flex circuit assembly at the dwell point.

12. The assembly of claim 10 wherein the dwell region or point is formed of a cut-out portion or void along a portion of the constraint layer damper spaced from opposed end portions of the constraint layer damper.

13. The assembly of claim 10 wherein the dwell region is formed along an hour-glass shaped portion of the constraint layer damper having a reduced bending stiffness relative to end portions of the constraint layer damper.

14. The assembly of claim 10 wherein a portion of the constraint layer damper includes a reduced width dimension to form the dwell region or point of the flex circuit assembly.

15. The assembly of claim 10 wherein the flex circuit assembly is connected to an arm movable to position the head relative to the data storage media and the dwell region or point is located to latch the head at a selected position relative to the data storage media.

16. The assembly of claim 10 wherein the flex circuit assembly is connected to an arm movable to position the head relative to the data storage media and the data storage media includes an inner region, a middle region and an outer region and the dwell region or point is located to latch the head proximate to the middle region of the data storage media.

17. A method for positioning one or more heads relative to a data storage media of a data storage device, the method comprising:
   energizing or supplying current to a positioning device to position the one or more heads relative to a select data track of the data storage media;
   maintaining a position of the head relative to the data storage media during an idle or standby period absent a bias current using a passive latch formed along a flex circuit assembly connected to an arm of the data storage device; and
   biasing the flex circuit assembly at a dwell point along the flex circuit assembly.

18. The method of claim 17 wherein the step of maintaining the position of the head comprises maintaining the position of the head proximate to a middle region of the data storage media.

* * * * *